Nov. 12, 1968  R. M. PETRIE  3,410,473
CORRUGATED BODIES AND METHOD OF FORMING SAME
Filed Aug. 22, 1966
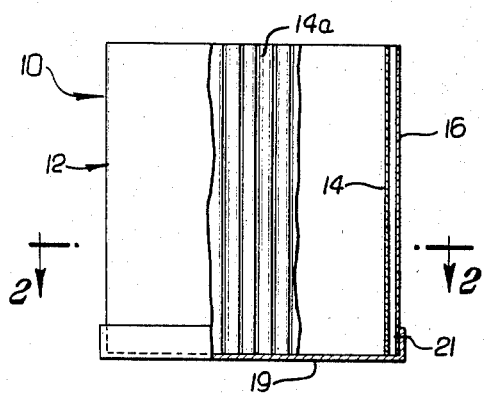
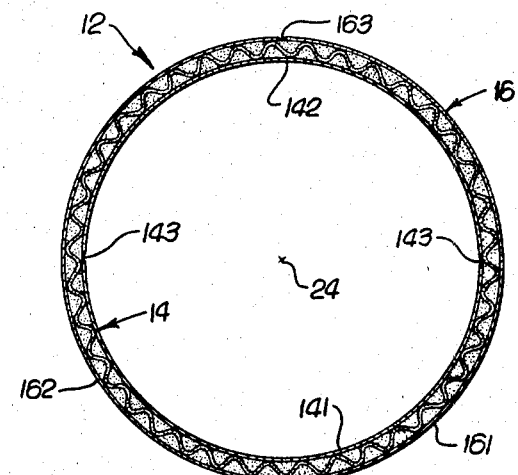
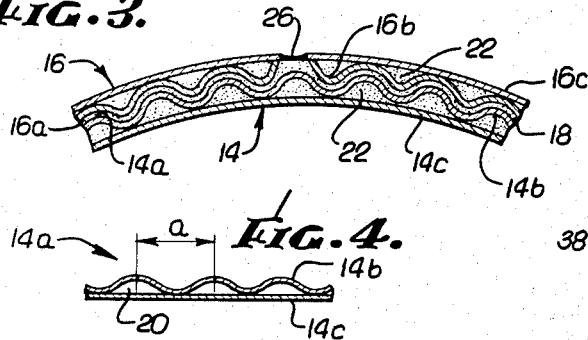
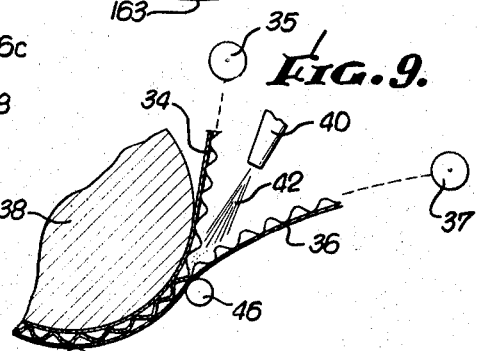
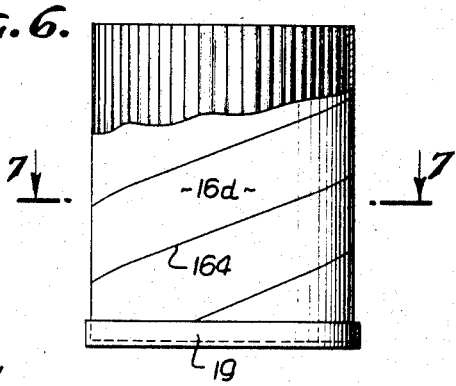
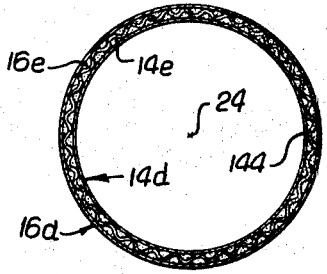
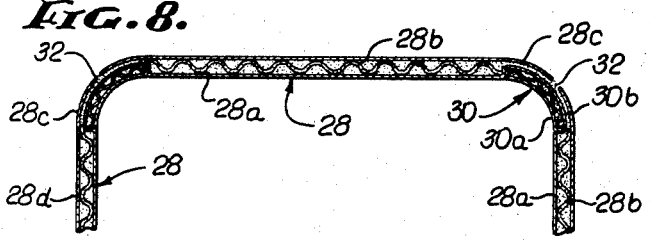
INVENTOR
ROBERT M. PETRIE
by White & Haefliger
ATTORNEYS.

United States Patent Office 3,410,473
Patented Nov. 12, 1968

3,410,473
CORRUGATED BODIES AND METHOD
OF FORMING SAME
Robert M. Petrie, 8268 Fernadel,
Pico Rivera, Calif. 90660
Filed Aug. 22, 1966, Ser. No. 573,963
17 Claims. (Cl. 229—4.5)

ABSTRACT OF THE DISCLOSURE

A container is fabricated by intermeshing in the desired configuration at least two sheets, each having one substantially planar layer and one corrugated layer, assembled to define channels therebetween, and each reinforced with higher modulus filler in the channels, prior to intermeshing.

This invention relates to packaging in general and is more particularly concerned with a novelly constructed container affording economy of materials, ease of set-up and high rigidity-to-weight ratios and method of manufacture for such containers.

As used herein the term "containers" refers to shaped structures which are intended to ultimately surround or enclose for decorative or protective purposes one or more articles along or in combination with other materials. Thus "containers" includes boxes, sleeves, tubes, drums and the like. The containers of this invention each have a wall formed of at least two sheets having opposed interfitting surfaces fastened together, which sheets may include additionally rigidifying material.

Container design is generally a compromise of cost and protection considerations. Elements of container cost are materials cost, shipping cost and assembly cost; elements of protection are rigidity (resistance to deflection), moisture proofness and structural integrity. In general the strongest container heretofore has been the most costly. This is a result of the use of extra thicknesses or weight of material which increases materials cost, specialized factory assembly at a manufacturer's plant remote to the users plant which involves extra shipping cost or on-site fabrication by costly specialized machinery which increases assembly costs. High strength containers can be shipped relatively inexpensively if nested but such containers are of quite limited style. Box blanks provide another means of lowering shipping costs but special assembly areas and equipment may be needed to set-up the boxes so that savings are erased.

The present invention has as its purpose the provision of a container and method for container production enabling lower cost, on-site assembly from "blanks", and consequent freight saving, and lower material costs for a given level of rigidity. In other words this invention offers an alternative to the usual compromise of cost and protection by affording a container providing maximum protection at lowest cost.

In general, the container of this invention has a wall which includes first and second sheets each having a corrugated face forming an array of substantially parallel ribs, the corrugated faces of the sheets extending in meshed relation to reinforce the wall, and means to fix the sheets in meshed relation. Additional rigidity at little increase in cost is achieved by employing a sheet which includes corrugated and substantially planar layers assembled to form channels therebetween, and a higher modulus filler material in the channels acting to reinforce the sheet. As will be seen, containers of various configurations are within the scope of the invention, e.g., tubular containers having an arcuate side-wall, in which the pitch distances of the second sheet ribs are greater than the pitch distances of the first sheet ribs and straight sided containers having at least three walls arranged to enclose a space and fastened at their intersections.

The method of container manufacture of this invention contemplates the steps including configuring a first sheet in the form of a container wall, the sheet having periodic undulations on a face thereof opposing said first sheet, providing a second sheet having corresponding periodic undulations on a face thereof opposing the first sheet face, meshing the faces in mutually supporting relation and fastening the sheets together in such relation. Further, at least one of the sheets may include corrugated and substantially planar layers assembled to form channels and the method may include reinforcing such sheet with filler material in the channels. The sheet can be configured about a central axis with the first, inner sheet wrapped around a forming mandrel to meet itself and with the undulating face directed outwardly and the second, outer sheet overlying all or a portion of the first sheet with seams offset or for greatest strength wrapped helically around the first, inner sheet in meshing relation. All of these steps may be performed by hand at a job-site to form strong, inexpensive containers.

These and other objects and advantages of the invention will be described hereinafter in greater detail in conjunction with the attached drawings in which:

FIG. 1 is a side view in elevation of a typical container according to the invention, centrally broken away to show the underlying ribbed structure and further broken away on the right hand side to show the side wall in cross-section;

FIG. 2 is a cross-section taken along line 2—2 in FIG. 1;

FIG. 3 is an enlarged view of the joint between abutting outer sheets supported by an inner sheet;

FIG. 4 is an enlarged view in cross-section of a typical inner sheet having a pitch distance $a$;

FIG. 5 is a view similar to FIG 4, but of an outer sheet having a pitch distance $b$;

FIG. 6 is a view like FIG. 1 of a convolute version of the container;

FIG. 7 is a cross-section taken along line 7—7 in FIG. 6;

FIG. 8 is a cross-sectional view like FIG. 7 of another embodiment of the invention;

FIG. 9 is a schematic of a method of assembling the sheets.

Turning now to the drawings in detail, FIGS. 1 and 2 show a container 10 having a wall 12 which includes first sheet 14 and second sheet 16, each having an array of ribs 14a and 16a respectively forming a corrugated face, which extend in meshed relation along their peripheries to reinforce the wall in predetermined curved configuration, and means such as adhesive 18 between the sheets to fix them in meshed relation. End cap 19 closes one end of the container secured by staple 21.

Reinforcement of the wall is also provided by reinforcing the sheets by addition of filler material, typically a higher modulus material than the sheet material as will be described hereinafter. For example, as best shown in FIGS. 4 and 5, the sheets 14 and 16 include corrugated layers 14b and 16b respectively, and substantially planar layers 14c and 16c assembled to form channels 20 therebetween. Filler material 22 is typically located within the channels as seen in FIG. 3 to fill the space and thereby support the ribs 14a and 16a against crushing laterally during container use and to reinforce the wall 12 of the container against undue flexibility when laterally pressed and against crushing when loaded and stacked, in that the filled ribs in stacked alinement tend to stiffen the wall and to carry the weight of superposed structure.

The filler material is preferably insulative, inexpensive, rigid, and easy to incorporate into channels 20. Useful for this purpose are hydraulic setting materials such as cement and plaster of Paris, or more generally calcium compound containing hydraulic setting materials particularly calcium salts such as calcium sulfate. Other inorganic fillers such as fiber glass, while satisfactory, are generally more costly and less effective. Organic fillers such as cellulosic fillers, e.g., paper mache or particularly foamed or solid plastics, e.g. thermosetting plastics such as phenolic, epoxy and urethane resins or thermoplastics such as styrene and ethylene polymers and copolymers can also be used.

While various forms of containers are useful, a highly desirable configuration for the structures of this invention is the tubular or sleeve configuration as illustrated in FIG. 2. As there shown the container has an interior axis 24 and the sheets 14 and 16 extend arcuately about the axis and define a generally tubular side wall 12. It will be apparent that the lineal extent of sheet 16 is greater than that extent of sheet 14 since the former circumscribes the latter. Nonetheless, because of a difference in pitch distance of ribs 14a and 16a, the two sheets mesh to hold the walls in semi-rigid cylindrical configuration. This pitch distance relation is also illustrated in FIGS 4 and 5. There substantially planar layers 14c and 16c support corrugated layers 14b and 16b of different length per unit of planar layer length. The pitch heights are approximately the same but the pitch distance for inner sheet ribs 14a, indicated by the letter a in FIG. 4, is less than the pitch distance for outer sheet ribs 16a, indicated by the letter b in FIG. 5. This difference permits an equal number of ribs 14a and 16a over different lengths of respective planar layers 14c and 16c and thus smooth meshing along a curved line. Further, meshing of the sheets at a job site results in the desired curved configuration, with predetermined container diameter.

A single sheet can be used to form either portion of the wall but more conveniently several sheets can be joined to form the inner, and several other sheets the outer, portion of the container wall. For example FIG. 2 there is shown a container wall 12 formed from two pairs of semi-cylindrical sheets. The inner sheet 14 is comprised of a first section 141 and a second section 142 joined at their abutting edges at seams on joints 143. The outer sheet 16 is comprised of a first section 161 and a second section 162 joined at their abutting edges at seams or joints 163. The seams are seen to be circularly offset between first and second sheets, and thus reinforcement is provided to each joint. Although the offset is illustrated to be 90°, it may be less so long as the joints 143 are not closer than about 45°, for strength reasons. The seam or joint between abutting or contiguous outer sheet sections is shown enlarged in FIG. 3. If desired any gap between sheet sections can be filled as by a spacer 26 as shown.

In the container embodiment discussed above, the sheets or sheet sections forming the inner and outer portions of the wall were similarly alined with respect to the axis. This relation is not required and in fact a superior container design for many applications is one in which at least one wall is convolute, that is helically alined with respect to the axis. If only one sheet is thus alined, it will generally be the outer sheet, particularly where liquids or semi-fluids are to be packaged, as the helical seam is considerably longer than a side seam and as an interior seam would offer increased opportunity for a leaking failure. This arrangement of sheets is shown in FIGS. 6 and 7. As shown outer sheet 16d is wound helically with respect to axis 24 about inner sheet 14d. The helically wound sheet is cut from stock in a manner providing an array of ribs 16e which parallels the ribs 14e for meshing when pressed together in offset relation.

In FIGS. 6 and 7 it is seen that the inner sheet 14 is curved to meet itself, with sheet terminals forming side seam 144, which is clearly shorter than helical seam 164 spiraling around the exterior of the container. The outer sheet and inner sheet in this embodiment also cooperate to reinforce the joints as above.

Containers of other than curvilinear cross-section are formable from the basic wall construction of the present invention. Straight sided containers which include at least three and usually four side walls arranged to enclose a space can be formed of sheets including corrugated and substantially planar layers assembled to form channels therebetween and corner wall sections at the intersections of the side wall sheets, adapted to fit between the side walls laterally adjacent to the therebetween corner wall section to engage the same to support the walls in space enclosing relation. For example, as seen in FIG. 8, side wall sections 28 each formed of two interfitting corrugated sheets 28a and 28b are joined at corner wall sections 30 similarly formed of sheets 30a and 30b by means of flaps 28c which can be extensions of outer sheet planar layer 28d and secured in position by adhesive 32. The corner wall section is generally constructed like sections such as 141 or 161 with different pitch distances for the two component sheets of the wall. Obviously other means of fastening together straight side walls constructed according to the present invention than that illustrated can be used within the scope of my invention to form containers of all descriptions.

In the present method a container is formed by configuring a first sheet in the form of a container wall, the sheet having periodic undulations on a face thereof, providing a second sheet having corresponding periodic undulations on a face thereof opposing the first sheet face, meshing the sheet faces in mutually supporting relation, and fastening the first and second sheet. The formation of a curved container wall is illustrated in FIG. 9. As there shown a first sheet 34 is unrolled from supply roll 35 and a second sheet 36 is unrolled from a supply roll 37. Mandrel 38 may be used to support the first sheet. Adhesive dispenser 40 deposits adhesive 42 onto the upwardly facing corrugations of the second sheet. The second sheet is progressively wrapped over the first sheet with ribs of the sheets in meshed relation. Pressure rolls 46 squeeze the sheets into engagement at an overall thickness not substantially greater than either single sheet. The second sheet meshing can be effected by helically wrapping the second sheet about the first sheet. By similar procedure, two sheets may be meshed to form a planar or flat wall.

The sheets can be arranged in proper position as a single unit or in sections, e.g., the meshing step can be carried out to mesh one of the first sheets with two of the second sheets and vice versa.

Filler material, if any, is added to the sheet channels at any point in the container construction. Thus sheets in their formation can be filled, or channels formed can be filled, or assembled sheets can have their channels filled. In each instance the filler, in fluid condition, is introduced into the channels and permitted to set.

The sheets can comprise any of various materials useful for containers. Outstanding for strength and low cost is corrugated board. Other cellulosic materials or synthetic materials such as polystyrene can be used. The adhesive used to fasten sheets together will depend on the material of the sheets. If a cellulosic material natural and synthetic glues such as animal based or phenolic glues will be highly satisfactory.

I claim:

1. In the method of forming a container, the steps including configuring a first sheet in the form of a container wall, said sheet having corrugated and substantially planar layers assembled to form channels therebetween and reinforced with higher modulus filler material in said channels, providing a second sheet having corresponding assembly and reinforcement opposing said first sheet, meshing said sheets in mutually supporting relation, and fastening said first and second sheets together in said relation.

2. Method as claimed in claim 1 including also the step of reinforcing said sheets by filling the channels thereof with hydraulic setting material.

3. Method as claimed in claim 1 in which said meshing step is carried out to mesh one of said first sheets with two of said second sheets.

4. Method as claimed in claim 1 in which the container has a central axis and the configuring step includes arranging the first sheet about said axis with the corrugated layer thereof directed outwardly relative to said axis, said meshing step being carried out to cause the second sheet corrugated layer to face toward said axis and to maintain greater pitch distance than the first sheet corrugated layer.

5. Method as claimed in claim 4 in which the configuring step is carried out to arrange the first sheet tubularly about the container central axis, and said meshing step is carried out to wrap the second sheet helically about said first sheet in meshing relation therewith.

6. Method as claimed in claim 1 in which said configuring step is carried out by wrapping the first sheet at least part way about a mandrel.

7. Method claimed in claim 6 in which said configuring step is carried out by wrapping the first sheet around a mandrel to meet itself.

8. Container having a wall which includes first and second sheets each having corrugated and substantially planar layers assembled to form channels therebetween, the corrugated layers of said sheets extending in meshed interconnected relation, and each including a higher modulus filler material in said channels acting to reinforce said container.

9. Container as claimed in claim 8 in which container has an interior axis, and the sheets extend arcuately about said axis and define a generally tubular side wall.

10. Container as claimed in claim 8 in which the filler material is an hydraulic setting material.

11. Container as claimed in claim 10 in which the second sheet extends helically around the container axis.

12. Container as claimed in claim 9 in which the first sheet extends around said axis with terminals brought into mutual proximity to form a joint, said second sheet overlapping said joint.

13. Container as claimed in claim 8 in which the container wall is substantially flat, the container also having curved wall sections.

14. Container as claimed in claim 8 in which one of said first sheets extends in meshing relation with two of said second sheets.

15. Container as claimed in claim 14 including cylindrical section first sheets located to form an inner cylinder with joints, cylindrical section second sheets located to form an outer cylinder and overlapping said joints.

16. Container as defined in claim 9 in which the sheets define a side wall and including also an end closure.

17. Container as defined in claim 10 in which the mineral filler comprises calcium sulfate.

References Cited

UNITED STATES PATENTS

| | | | |
|---|---|---|---|
| 1,119,146 | 12/1914 | Ferres | 161—135 |
| 1,158,581 | 11/1915 | Swift | 229—90 |
| 1,802,522 | 4/1931 | Moll | 161—135 |
| 1,902,312 | 3/1933 | Rous | 161—137 X |
| 2,422,998 | 6/1947 | Adams et al. | 161—137 X |
| 2,641,402 | 6/1953 | Bruun | 229—4.5 |
| 2,751,765 | 6/1956 | Rowland et al. | 229—90 X |
| 2,973,295 | 2/1961 | Rodgers | 161—137 X |
| 3,145,131 | 8/1964 | Finke | 161—135 X |

FOREIGN PATENTS

| | | |
|---|---|---|
| 413,439 | 5/1925 | Germany. |
| 114,053 | 10/1941 | Australia. |

DAVIS T. MOORHEAD, *Primary Examiner.*